United States Patent
Dani et al.

(10) Patent No.: US 12,413,615 B2
(45) Date of Patent: *Sep. 9, 2025

(54) ATTACK PATH AND GRAPH CREATION BASED ON USER AND SYSTEM PROFILING

(71) Applicant: Qualys, Inc., Foster City, CA (US)

(72) Inventors: Mayuresh Vishwas Dani, Fremont, CA (US); Ankur S. Tyagi, Foster City, CA (US); Rishikesh Jayaram Bhide, Pune (IN)

(73) Assignee: Qualys, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,442

(22) Filed: Mar. 8, 2024

(65) Prior Publication Data

US 2024/0214411 A1 Jun. 27, 2024

Related U.S. Application Data

(63) Continuation of application No. 17/839,339, filed on Jun. 13, 2022, now Pat. No. 11,968,225, which is a
(Continued)

(51) Int. Cl.
*H04L 9/40* (2022.01)

(52) U.S. Cl.
CPC ................. *H04L 63/1433* (2013.01)

(58) Field of Classification Search
CPC .................................................. H04L 63/1433
See application file for complete search history.

(56) References Cited

U.S. PATENT DOCUMENTS

| | | | |
|---|---|---|---|
| 6,952,779 B1 * | 10/2005 | Cohen | H04L 63/1433 726/22 |
| 10,754,959 B1 * | 8/2020 | Rajasooriya | G06N 7/01 |

(Continued)

FOREIGN PATENT DOCUMENTS

| | | | | |
|---|---|---|---|---|
| WO | WO-2014066319 A1 * | 5/2014 | | G06F 21/55 |
| WO | WO-2018165602 A1 * | 9/2018 | | G06F 21/53 |

OTHER PUBLICATIONS

Microsoft, "Allocated Altitudes", Retrieved from: https://docs.microsoft.com/en-us/windows-hardware/drivers/ifs/allocated-altitudes, Published on Apr. 20, 2017, 92 pages.
(Continued)

*Primary Examiner* — Sarah Su
(74) *Attorney, Agent, or Firm* — Baker & McKenzie LLP

(57) ABSTRACT

Methods and systems for generating an attack path based on user and system risk profiles are presented. A method comprises determining user information associated with a computing device; determining system exploitability information of the computing device; determining system criticality information of the computing device; determining a risk profile for the computing device based on the user information, the system exploitability information, and the system criticality information; and generating an attack path based on the risk profile. The attack path indicates a route through which an attacker accesses the computing device. The system exploitability information is associated with or based on one or more of the vulnerability associated with the computing device, an exposure window associated with the computing device, and a protection window associated with the computing device. The system criticality information is associated with or based on one or more assets and services associated with the computing device.

22 Claims, 5 Drawing Sheets

Related U.S. Application Data continuation of application No. 16/516,734, filed on Jul. 19, 2019, now Pat. No. 11,363,052.

(56) References Cited

U.S. PATENT DOCUMENTS

| | | | | |
|---|---|---|---|---|
| 10,848,515 | B1* | 11/2020 | Pokhrel | H04L 63/1433 |
| 11,363,052 | B2* | 6/2022 | Dani | H04L 63/1433 |
| 11,483,335 | B1* | 10/2022 | Tsokos | G06N 7/01 |
| 11,704,414 | B2* | 7/2023 | Patel | G06F 21/604 |
| | | | | 726/25 |
| 11,968,225 | B2* | 4/2024 | Dani | H04L 63/1433 |
| 12,088,618 | B2* | 9/2024 | Revankar | H04L 63/1441 |
| 2015/0058993 | A1* | 2/2015 | Choi | H04L 63/1433 |
| | | | | 726/25 |
| 2015/0101053 | A1 | 4/2015 | Sipple | |
| 2016/0359872 | A1* | 12/2016 | Yadav | H04L 63/1408 |
| 2017/0244744 | A1 | 8/2017 | Key et al. | |
| 2017/0286690 | A1* | 10/2017 | Chari | G06F 21/577 |
| 2018/0025154 | A1 | 1/2018 | Cornell et al. | |
| 2018/0176245 | A1 | 6/2018 | Cornell et al. | |
| 2018/0351987 | A1 | 12/2018 | Patel et al. | |
| 2020/0137103 | A1 | 4/2020 | Ngo et al. | |
| 2020/0327222 | A1* | 10/2020 | Chhabra | H04L 63/0421 |
| 2020/0351298 | A1 | 11/2020 | Paturi et al. | |
| 2020/0380522 | A1 | 12/2020 | Perkal et al. | |
| 2021/0297441 | A1 | 9/2021 | Olalere | |
| 2021/0392163 | A1 | 12/2021 | Tang et al. | |
| 2022/0060509 | A1 | 2/2022 | Crabtree et al. | |
| 2022/0116783 | A1 | 4/2022 | Goel | |
| 2023/0140160 | A1 | 5/2023 | Vetsch et al. | |

OTHER PUBLICATIONS

Microsoft, "All Attributes", Retrieved from: https://docs.microsoft.com/en-us/windows-hardware/drivers/ifs/allocated-altitudes, Published on May 31, 2018, 40 pages.

Broadcom, "Symantec™ DeepSight™ Intelligence", Retrieved from: https://docs.broadcom.com/docs/deepsight-intelligence-ds, Web Accessed; Mar. 4, 2020, 5 pages.

Broadcom, "Cyber Security Services: DeepSight™ Intelligence", Retrieved from: https://docs.broadcom.com/docs/deepsight-intelligence-overview-en, Web Accessed; Mar. 4, 2020, 6 pages.

\* cited by examiner

ATTACK PATH AND GRAPH CREATION BASED ON USER AND SYSTEM PROFILING

CROSS-REFERENCE TO RELATED APPLICATIONS

The present application claims priority to, and is a continuation of U.S. patent application Ser. No. 17/839,339, filed Jun. 13, 2022, which claims priority to, and is a continuation of U.S. patent application Ser. No. 16/516,734, filed Jul. 19, 2019, now U.S. Pat. No. 11,363,052, issued on Jun. 14, 2022, all the disclosures of which are incorporated by reference herein in their entirety for all purposes.

TECHNICAL FIELD

The present disclosure relates to computer security. More specifically, the present disclosure relates to methods and systems for generating an attack path based on user and computer system risk profile.

BACKGROUND

Computer security threats are increasingly evolving at an alarming rate. This is in part due to vulnerability information associated with networks, computing systems, and users that attackers exploit. For example, most organization are unaware that attackers sometimes target specific systems or users based on certain qualities of such users or based on certain security attributes (e.g., risk profiles) that the targeted computing systems or users have. For instance, a particular user may have a predilection to visit certain websites, download certain files/applications, enable certain specific computer security features on his/her computer, etc. This information, which can be mined by an attacker, can sometimes be used in executing a targeted computer security breach against such a user.

In some cases, attackers use system data associated with a given computing system to execute attacks against the given computing system. This data may include types of hardware of the computing system, the operating system of the computing system, services enabled on the computing system, etc. Once an attacker detects vulnerability in a given computer system's hardware or software configuration, the attacker proceeds to execute an attack on the computing system based on the detected vulnerability.

Furthermore, some attackers are able to leverage user information and system information across a plurality of computing devices in a given organization in order to execute a given attack campaign against said organization. An analysis of such attack campaigns usually show that the attackers work their way through certain computer assets (e.g., servers, databases, files, software, hardware, computing device, etc.) having certain vulnerability attributes in order to reach their targeted computer assets. In some instances, attackers follow certain "favorable" computer network routes that are likely to make the attack campaign against the given organization successful.

SUMMARY

According to one aspect of the subject matter described in this disclosure, a method for generating an attack path is presented. The method comprises determining user information indicating one or more user attributes associated with a vulnerability of a computing device. The method also comprises determining system exploitability information of the computing device, the system exploitability information indicating one or more of: the vulnerability associated with the computing device, an exposure window associated with the computing device, a protection window associated with the computing device. The method further comprises determining system criticality information of the computing device, the system criticality information indicating one or more: assets associated with the computing device, services associated with the computing device. In one implementation, the method comprises determining a risk profile for the computing device based on the user information, the system exploitability information, and the system criticality information. Based on the risk profile, the method initiates generation of an attack path the attack path indicating a route through which an attacker accesses the computing device.

Other implementations of one or more of these aspects include corresponding systems, apparatus, and computer programs, configured to perform the actions of the methods, encoded on computer storage devices. These and other implementations may each optionally include one or more of the following features. The one or more user attributes associated with the vulnerability of the computing device comprises: types of websites the user visits, the user's browser history data, types of files the user downloads types of files the user runs, passwords the user stores in a browser, application and system credentials of the user, sensitive user credentials such as internet information services (IIS) application pool, user credentials stored in plain-text on the computing device, number of browser extensions plugins associated with a browser of the user, number of plugins associated with the browser of the user, privileges of the user on the computing device, whitelisted applications within a security infrastructure associated with the user, and automatic logon configurations associated with the user. The vulnerability is based on data relating to vulnerability and patching (e.g., applying security patches) associated with the computing device. The data relating to vulnerability and patching include on one or more of: a hardware specification of the computing device, whether the operating system of the computing device is up to date, a list of shared directories on the computing device, whether the computing device has the latest patches, whether the computing device has the latest services enabled, one or more connectivity types associated with the computing device, and types of security solutions/systems associated with the computing device. The exposure window represents an average amount of time where the computing device remains unpatched after a new patch associated with the computing device is released. The protection window represents the average time where security solutions of the security infrastructure associated with the computing device do not have one or more of latest definitions, latest patches, and latest signatures. The risk profile is determined based on combining the user information, the system exploitability information, and the system criticality information

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion. Further, some components may be omitted in certain figures for clarity of discussion.

DETAILED DESCRIPTION

Figure 1:
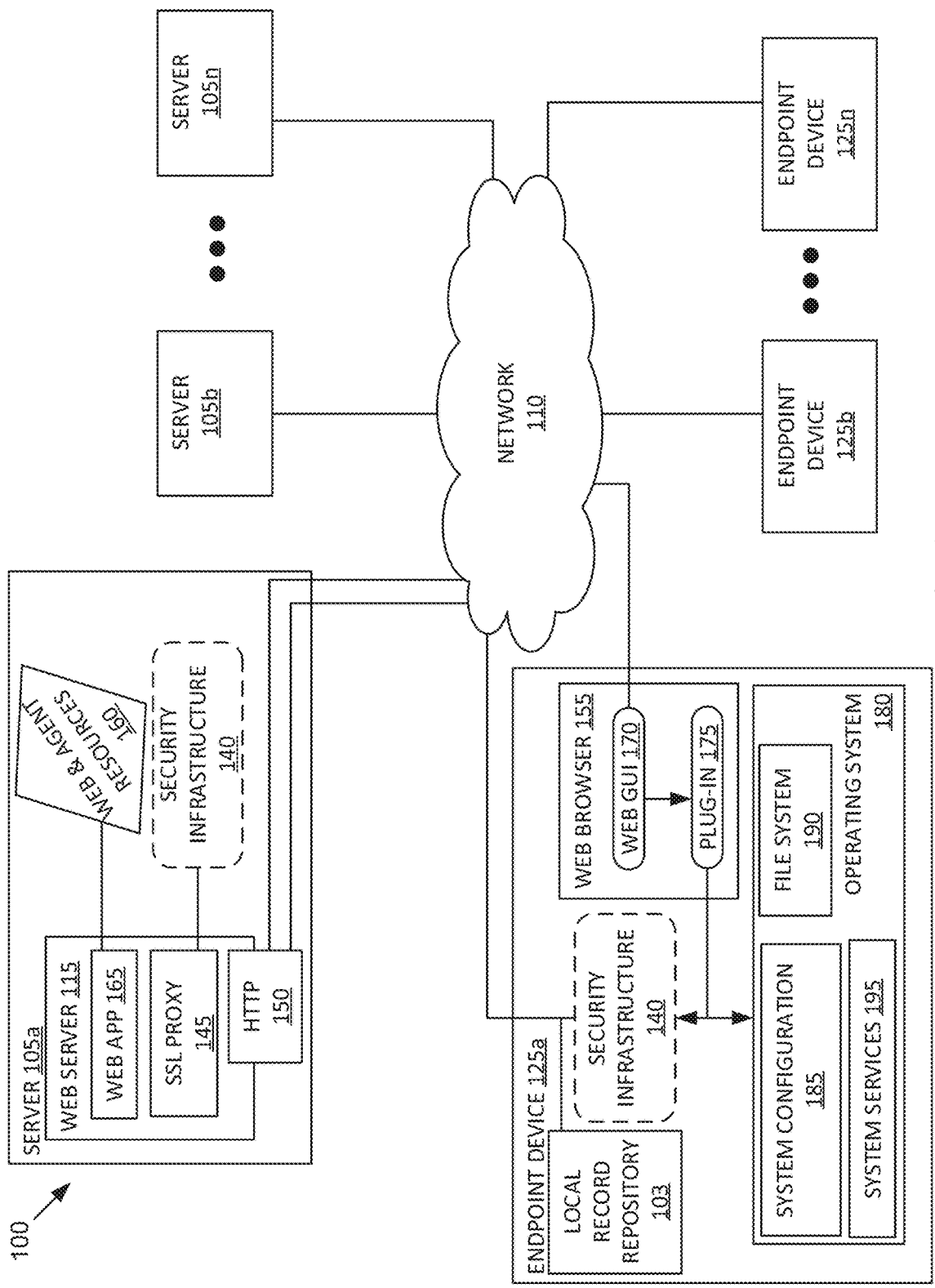
FIG. 1 shows a high level network diagram of an example system for which an attack path is generated, in accordance with some embodiments of this disclosure.

The present disclosure describes various techniques and systems for generating attack paths and for generating attack graphs based on user and/or system risk profiles. An attack path could include digital routes, digital pathways, or one or more computer systems through which an attacker works to get to/attack a targeted computing system/computer asset/computing device. In some embodiments, an attacker executes an attack campaign against a user or against an organization via a predefined path having specific vulnerability issues. An attack campaign could comprise a collection of techniques and tactics used to execute an attack on a computing system/device.

As previously noted, attackers such as Advanced Persistent Threat (APT) groups, Script Kiddies, White Hat hackers, Black Hat hackers, Grey Hat hackers, Green Hat hackers, Red Hat hackers, and Blue Hat hackers are increasingly improving their efforts to execute computer attacks (e.g., cyberattacks, attack campaigns, etc.) against individuals and organizations. These attackers execute attack types that include phishing attacks, spear phishing attacks, whale phishing attacks, malware attacks, ransomware attacks, drive-by attacks, Trojan horse attacks, SQL injection attacks, cross site scripting attacks, denial-of-service attacks, password attacks, data exfiltration attacks, eavesdropping attacks, birthday attacks, brute-force attacks, insider threat attacks, man-in-the-middle attacks, AI powered attacks, etc. Regardless of the attack type, attackers are often successful in implementing attack execution operations associated with a given attack type when they have some information about the individuals, and/or organizations, and/or computing systems, etc., that are being targeted. Information about targeted individuals, and/or organizations, and/or computing systems in some cases is computer security vulnerability information associated with the targeted individuals, and/or organizations, and/or computing systems. The more of this type of information is available to attackers, the higher the likelihood of attackers having successful attack execution operations.

Computer security vulnerability information is not only beneficial to attackers. Individuals and organizations that pay attention to this type of data are able to identify points of vulnerability within their computing infrastructure, determine likely attack paths that an attacker can use to execute attack execution operations associated with a specific attack type, prioritize securing (e.g., patch updates, OS updates, antivirus updates, and other security measures taken to secure a given computer system) computing assets within a giving computing infrastructure, and predicting attack paths for a given computing infrastructure, etc. In some embodiments, the vulnerability information may be used to simulate attack execution operations (e.g., red teaming/pentesting attack scenarios) in order to better understand vulnerable points within one's IT infrastructure. In some cases, the vulnerability information (e.g., comprised in the risk profile discussed below) may facilitate automatically selecting the most vulnerable or most lucrative assets (e.g., computing device, hardware and/or software resources) within a given computing system/device. In other cases, the data obtained from the vulnerability information may be "ingested" or processed by other systems (e.g., Artificial Intelligence software, machine learning resources, Qualys Breach and Attack Simulation system, etc.) in order to develop more robust computer security systems, tools, and security models. The systems discussed in this disclosure are able to determine computer security vulnerability information for a user, and/or organization, and/or a computing device associated the user and/or the organization and are subsequently used to generate attack paths.

System Environment

Illustrated in FIG. 1 is a high level diagram of a network diagram of an example system 100 for executing the principles disclosed herein. In the illustrated implementation, the system 100 may include servers 105*a*, 105*b* . . . 105*n* coupled to a network 110. The system 100 may also include exemplary endpoint devices 125*a*, 125*b* . . . 125*n* communicatively coupled via the network 110. For simplicity, a server 105 may be used in some cases to refer to one or more servers 105*a*, 105*b* . . . 105*n*. Similarly, an endpoint device 125 may be used in some instances to refer to one or more endpoint devices 125*a*, 125*b* . . . 125*n*.

The server 105 may include a computing device such as a mainframe server, a content server, a communication server, a laptop computer, a desktop computer, a handheld computing device, a smart phone, a smart watch, a wearable device, a touch screen, a biometric device, a video processing device, an audio processing device, a virtual machine, a cloud-based computing solution and/or service, and/or the like. The server 105 may include a plurality of computing devices configured to communicate with one another and/or implement the techniques described herein.

Figure 2:
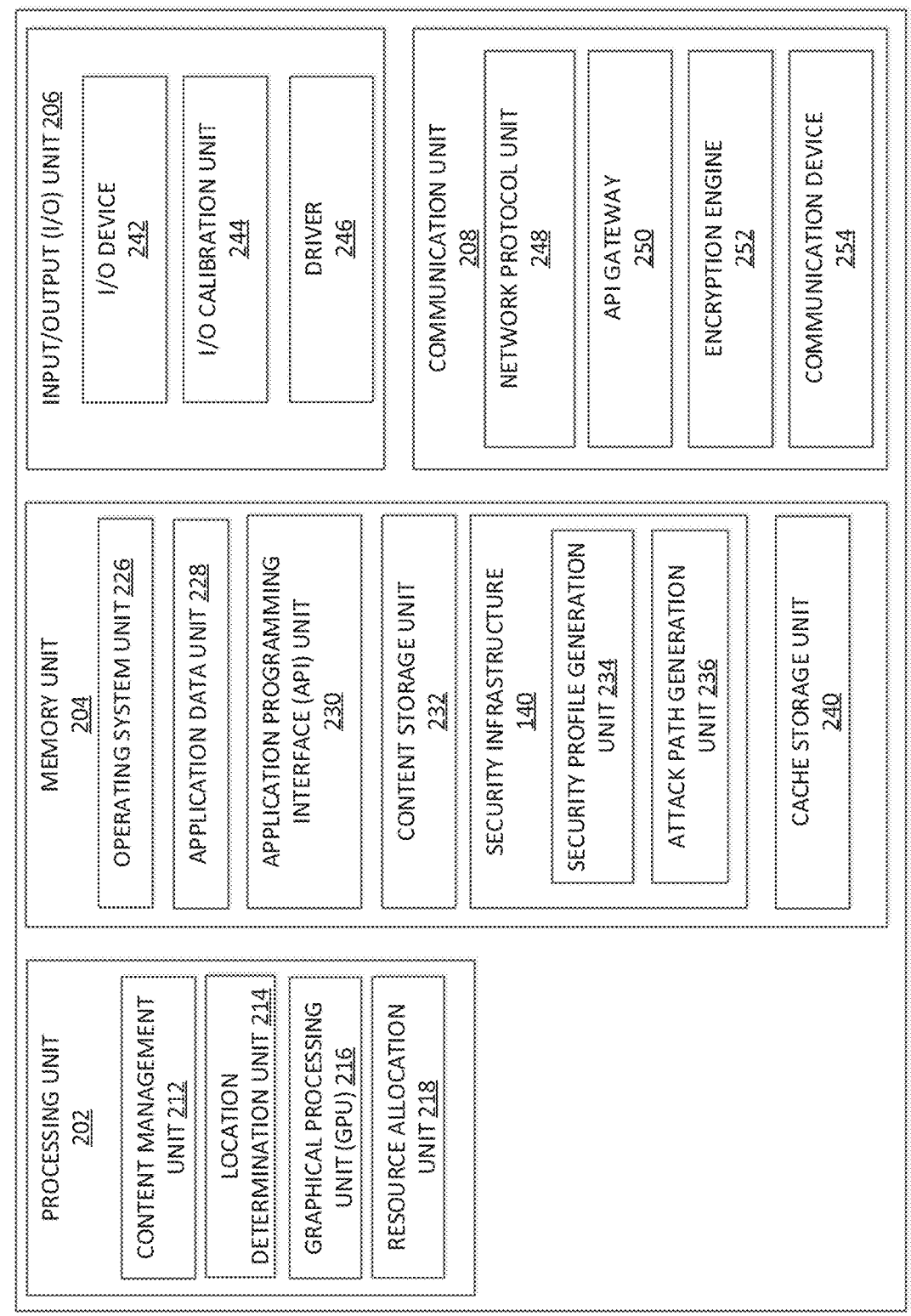
FIG. 2 is a functional block diagram of a computing environment, in accordance with some embodiments of this disclosure.
Figure 3:
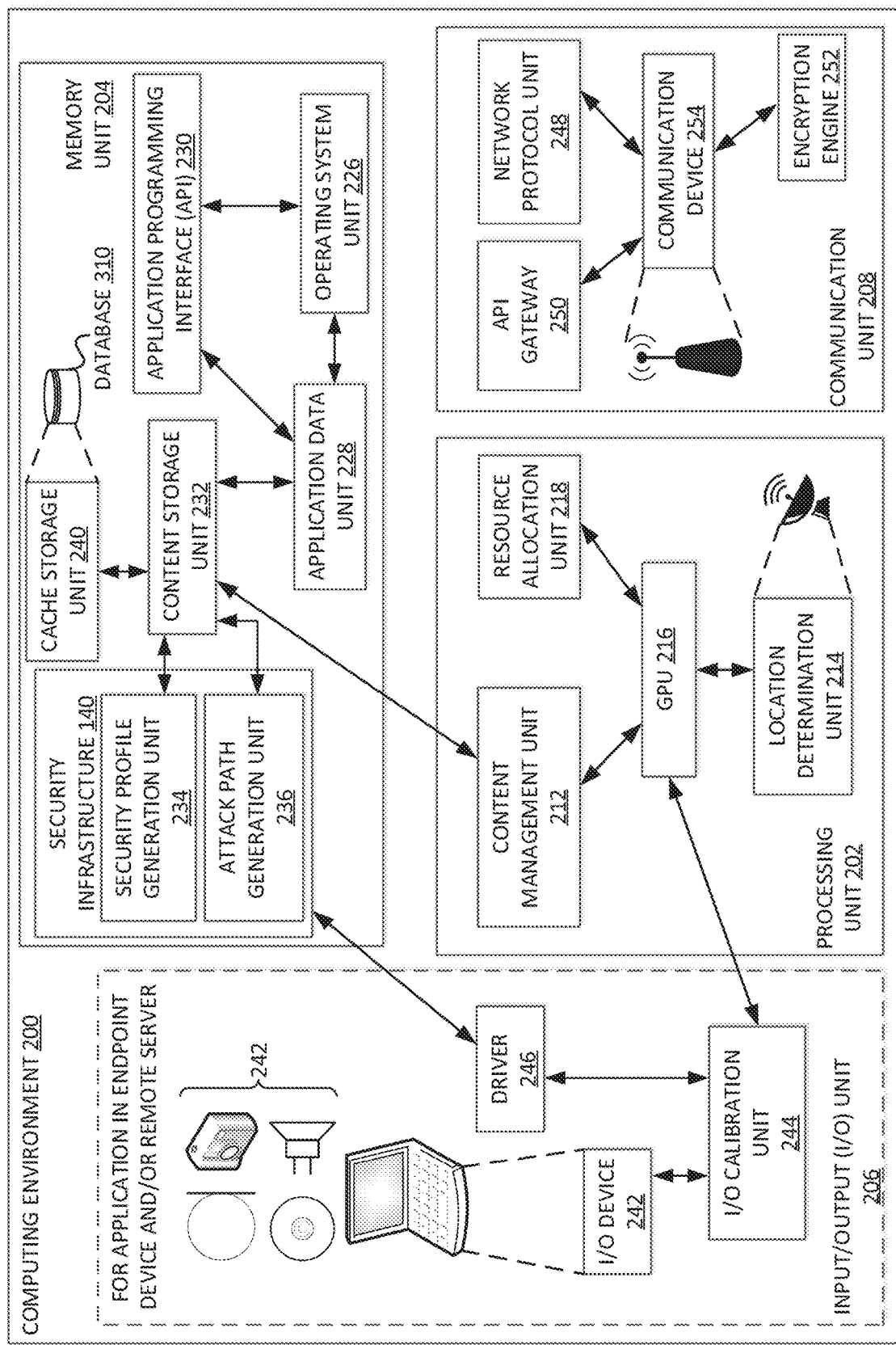
FIG. 3 is a detailed system diagram of a computing environment, in accordance with some embodiments of this disclosure.

In one embodiment, the server 105 may include various elements of a computing environment as described herein (e.g., computing environment 200 of FIG. 2 and/or FIG. 3). For example, the server 105 may include processing unit 202, a memory unit 204, an input/output (I/O) unit 206, and/or a communication unit 208. The server 105 may further include subunits and/or other instances as described herein for performing operations associated with malware detection and remediation. A user (e.g., network administrator) may operate server 105 either locally or remotely.

Further, the server 105 may include a web server 115, security infrastructure 140, and a web and agent resources 160. The web server 115, the security infrastructure 140, and the web and agent resources 160 are coupled to each other and to the network 110 via one or more signal lines. The one or more signal lines may be a wired and/or wireless connection. In some embodiments, the server 105 may be a database (DB) server and/or a file server such as those shown in FIG. 4.

The web server 115 may include a secure socket layer (SSL) proxy 145 for establishing HTTP-based connectivity 150 between the server 105 and other devices coupled to the network 110. Other forms of secure connection techniques, such as encryption, may be employed on the web server 115 and across the network 110. Additionally, the web server 115 may deliver artifacts (e.g., binary code, instructions, etc.) to the security infrastructure 140 either directly via the SSL proxy 145 and/or via the network 110. Additionally, the web and agent resources 160 of the server 105 may be provided to the endpoint device 125 via the web app 165 on the web server 115. The web and agent resources 160 may be used to render a web-based graphical interface (GUI) 170 via the browser 155 running on the endpoint device 125.

The security infrastructure 140 may either be on the server 105 and/or on the endpoint device 125. Security infrastructure 140 may include one or more computer security products such as access control software, anti-keyloggers, anti-malware, anti-spyware, anti-subversion software, anti-tamper software, antivirus software, cryptographic software, computer-aided dispatch (CAD), Firewall (web or otherwise), Intrusion detection systems (IDS), Intrusion prevention systems (IPS), log management software, records management software, Sandboxes (e.g., a secure environment in which various computing processes may be executed), security information management software, security information and event management (SIEM) software, anti-theft software, parental control software, cloud-based security protection, and/or the like.

In some embodiments, security infrastructure 140 can determine whether scan data is indicative of malware and generates a report indicating that the endpoint device 125 is exposed to risks associated with malware. The report may include a listing of identified attributes, a count of identified attributes, a type of each identified attribute, identification of each malware family and/or malware variant determined to be associated with the endpoint device 125, and/or one or more recommendations for addressing detected vulnerabilities. This record may be stored on the local record repository 103 and/or within a database.

In some cases, security infrastructure 140 can determine a risk profile associated with a given user, a risk profile associated with a given computer system associated with the user, a risk profile associated with a given organization, a risk profile associated with computing systems associated with the organization, etc. In particular, security infrastructure can include code/logic that operates at a desired level of granularity to determine computer vulnerability information included in a given risk profile. The level of granularity could be based on a single computing system associated with an individual or organization, multiple computing systems associated with an individual or organization, specific hardware resources associated with a computing system of an individual or organization, specific software resources associated with a computing system of an individual or organization, etc.

In some cases, the security infrastructure 140 may determine vulnerable computer assets (e.g., computer systems/devices, files, software resources, hardware resources, etc.) associated with an individual (e.g., user of security infrastructure 140) or organization based on the security profile of the individual and/or security profile of the organization as discussed above. In other embodiments, the security infrastructure 140 may determine attack paths to vulnerable assets within the software and/or hardware configuration of the system 100. In some cases, the security infrastructure 140 may "feed" security profile data (e.g., computer vulnerability information) to an ingesting product (e.g., third-party analytics software) and or to security specialists for further analysis. In one embodiment, further analysis of security profile data may include using graph theory to determine a path of least resistance to a given computer asset with the system 100, alternative paths to a given computer asset when security parameters are varied within the system 100, remediation strategies to adopt given an identified path to a given computer asset within the system 100, etc.

In some further embodiments, the security infrastructure 140 may access an operating system 180 of the endpoint device 125 in order to execute security operations as discussed elsewhere in this disclosure. For instance, the security infrastructure 140 may gain access into the operating system in order to scan a security posture of the endpoint device 125 by scanning a system configuration 185, a file system 190, and/or system services 195 of the endpoint device 125. The plug-in 175 of the web browser 155 may provide needed downloads that facilitate operations executed by the operating system 180, the security infrastructure 140, and/or other applications running on the endpoint device 125.

The network 110 may include a plurality of networks. For instance, the network 110 may include any wired and/or wireless communication network that facilitates communication between the server 105 and the endpoint device 125. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like.

Turning back to FIG. 1, the endpoint device 125 may be a handheld computing device, a smart phone, a tablet, a laptop computer, a desktop computer, a personal digital assistant (PDA), a smart watch, a wearable device, a biometric device, an implanted device, a camera, a video recorder, an audio recorder, a touchscreen, a computer server, a virtual server, a virtual machine, and/or a video communication server. In some embodiments, the endpoint device 125 may include a plurality of computing devices configured to communicate with one another and/or implement the techniques described herein.

The local record repository 103, shown in association with the endpoint device 125, may be one or more storage devices that store data, information, and instructions used by the endpoint device 125 and/or other devices coupled to the network 110. The stored information may include various logs/records associated with captured security data/security events by the security infrastructure 140. For example, the various reports, logs, data, etc., generated by the one or more security products of the security infrastructure 140 may be stored in the local record repository. In some embodiments, the local record repository also stores cache data, user preference data, security profile data including computer security vulnerability data, etc.

The one or more storage devices discussed above in association with the local record repository 103 can be non-volatile memory or similar permanent storage device and media. For example, the one or more storage devices may include a hard disk drive, a floppy disk drive, a CD-ROM device, a DVD-ROM device, a DVD-RAM device, a DVD-RW device, a flash memory device, solid state media, or some other mass storage device known in the art for storing information on a more permanent basis.

FIGS. 2 and 3 illustrate exemplary functional and system diagrams of a computing environment 200, according to some embodiments of this disclosure, for performing the operations described herein. Specifically, FIG. 2 provides a functional block diagram of the computing environment 200, whereas FIG. 3 provides a detailed system diagram of the computing environment 200.

As seen in FIGS. 2 and 3, the computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described herein. Additionally, each unit and/or subunit may be operatively and/or otherwise communicatively coupled with each other so as to facilitate the operations described herein. The computing environment 200 including any of its units and/or subunits may include general hardware, specifically-purposed hardware, and/or software.

Importantly, the computing environment 200 and any units and/or subunits of FIG. 2 and/or FIG. 3 may be included in one or more elements of system 100 as described with reference to FIG. 1. For example, one or more elements (e.g., units and/or subunits) of the computing environment 200 may be included in the server 105 and/or the endpoint device 125.

The processing unit 202 may control one or more of the memory unit 204, the I/O unit 206, and the communication unit 208 of the computing environment 200, as well as any included subunits, elements, components, devices, and/or functions performed by the memory unit 204, I/O unit 206, and the communication unit 208. The described sub-elements of the computing environment 200 may also be included in similar fashion in any of the other units and/or devices included in the system 100 of FIG. 1. Additionally, any actions described herein as being performed by a processor may be taken by the processing unit 202 of FIG. 2 and/or FIG. 3 alone and/or by the processing unit 202 in conjunction with one or more additional processors, units, subunits, elements, components, devices, and/or the like. Further, while one processing unit 202 may be shown in FIG. 2 and/or FIG. 3, multiple processing units may be present and/or otherwise included in the computing environment 200 or elsewhere in the overall system (e.g., system 100 of FIG. 1). Thus, while instructions may be described as being executed by the processing unit 202 (and/or various subunits of the processing unit 202), the instructions may be executed simultaneously, serially, and/or otherwise by one or multiple processing units 202 on one or more devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, media content, malware content, or any combination thereof. In some instances, Content on which the content management unit 212 may operate includes device information, user interface data, images, text, themes, audio files, video files, documents, and/or the like. Additionally, the content management unit 212 may control the audio-visual environment and/or appearance of application data during execution of various processes (e.g., via web GUI 170 at the endpoint device 125). In some embodiments, the content management unit 212 may interface with a third-party content server and/or memory location for execution of its operations.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information.

The GPU 216 may facilitate generation, modification, analysis, processing, transmission, and/or presentation of content described above, as well as any data (e.g., scanning instructions, scan data, and/or the like) described herein. In some embodiments, the GPU 216 may be utilized to render content for presentation on a computing device (e.g., via web GUI 170 at the endpoint device 125). The GPU 216 may also include multiple GPUs and therefore may be configured to perform and/or execute multiple processes in parallel. In some implementations, the GPU 216 may be used in conjunction with security profile generation unit 234, attack path generation unit 236, a threat detection unit (not shown), a scan history unit (not shown), and/or other subunits associated with the memory unit 204, the I/O unit 206, the communication unit 208, and/or a combination thereof.

The resource allocation unit 218 may facilitate the determination, monitoring, analysis, and/or allocation of computing resources throughout the computing environment 200 and/or other computing environments. For example, the computing environment may facilitate a high volume of data (e.g., files, malware, malware variants, etc.), to be processed and analyzed. As such, computing resources of the computing environment 200 utilized by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may utilize computing resources of a second computing environment separate and distinct from the computing environment 200 to facilitate a desired operation.

For example, the resource allocation unit 218 may determine a number of simultaneous computing processes and/or requests. The resource allocation unit 218 may also determine that the number of simultaneous computing processes and/or requests meets and/or exceeds a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

In some embodiments, data affecting the allocation of computing resources by the resource allocation unit 218 may include the number of computing processes and/or requests, a duration of time during which computing resources are required by one or more elements of the computing environment 200, and/or the like. In some implementations, computing resources may be allocated to and/or distributed amongst a plurality of second computing environments included in the computing environment 200 based on one or more data mentioned above. In some embodiments, the allocation of computing resources of the resource allocation unit 218 may include the resource allocation unit 218 flipping a switch, adjusting processing power, adjusting memory size, partitioning a memory element, transmitting data, controlling one or more input and/or output devices, modifying various communication protocols, and/or the like. In some embodiments, the resource allocation unit 218 may facilitate utilization of parallel processing techniques such as dedicating a plurality of GPUs included in the processing unit 202 for running a multitude of processes.

The memory unit 204 may be utilized for storing, recalling, receiving, transmitting, and/or accessing various files and/or data (e.g., malware files, malware samples, scan data, and/or the like) during operation of computing environment 200. For example, memory unit 204 may be utilized for storing, recalling, and/or updating scan history information as well as other data associated with, resulting from, and/or generated by any unit, or combination of units and/or subunits of the computing environment 200. In some embodiments, the memory unit 204 may store instructions, code, and/or data that may be executed by the processing unit 202. For instance, the memory unit 204 may store code that executes operations associated with one or more units and/or one or more subunits of the computing environment 200. For example, the memory unit may store code for the processing unit 202, the I/O unit 206, the communication unit 208, and for itself.

Memory unit 204 may include various types of data storage media such as solid state storage media, hard disk storage media, virtual storage media, and/or the like. Memory unit 204 may include dedicated hardware elements such as hard drives and/or servers, as well as software elements such as cloud-based storage drives. In some implementations, memory unit 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 may include one or more databases 310 (shown in FIG. 3) for storing any data described herein. For example, depending on the implementation, the one or more databases may be used as the local record repository 103 of the endpoint device discussed with reference to FIG. 1. Additionally or alternatively, one or more secondary databases located remotely from computing environment 200 may be utilized and/or accessed by memory unit 204. In some embodiments, memory unit 204 and/or its subunits may be local to the server 105 and/or the endpoint device 125 and/or remotely located in relation to the server 105 and/or the endpoint device 125.

Turning back to FIG. 2, the memory unit 204 may include subunits such as an operating system unit 226, an application data unit 228, an application programming interface 230, a content storage unit 232, security infrastructure 140, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described herein.

The operating system unit 226 may facilitate deployment, storage, access, execution, and/or utilization of an operating system utilized by computing environment 200 and/or any other computing environment described herein. In some embodiments, operating system unit 226 may include various hardware and/or software elements that serve as a structural framework for processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application utilized by computing environment 200 and/or any other computing environment described herein. For example, the endpoint device 125 may be required to download, install, access, and/or otherwise utilize a software application (e.g., web application 165) to facilitate performance of malware scanning operations and/attack path generation as described herein. As such, application data unit 228 may store any information and/or data associated with an application. Application data unit 228 may further store various pieces of information and/or data associated with the operation of an application and/or computing environment 200 as a whole, such as a status of computing resources (e.g., processing power, memory availability, resource utilization, and/or the like), runtime information, user interfaces, modules to direct execution of operations described herein, user permissions, security credentials, and/or the like.

The application programming interface (API) unit 230 may facilitate deployment, storage, access, execution, and/or utilization of information associated with APIs of computing environment 200 and/or any other computing environment described herein. For example, computing environment 200 may include one or more APIs for various devices, applications, units, subunits, elements, and/or other computing environments to communicate with each other and/or utilize the same data. Accordingly, API unit 230 may include API databases containing information that may be accessed and/or utilized by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the server 105 and the endpoint device 125 to communicate with each other.

The content storage unit 232 may facilitate deployment, storage, access, and/or utilization of information associated with performance of malware scanning operations and/or framework processes by computing environment 200 and/or any other computing environment described herein. In some embodiments, content storage unit 232 may communicate with content management unit 212 to receive and/or transmit content files (e.g., media content).

Security infrastructure 140 may include at least a security profile generation unit 234, attack path generation unit 236, threat detection unit (not shown), and a scan history unit (not shown). In one embodiment, security profile generation unit 234 may generate a risk profile of a user of the endpoint device 125. This type of risk profile may be referred to simply as "user behavior" or "user information" in some embodiments. In some cases, the risk profile of the user may indicate one or more user attributes associated with a vulnerability of a computing device associated with the user. The one or more user attributes in one embodiment include: types of websites the user visits, the user's browser history data, types of files the user downloads/runs, passwords the user stores in a browser, application and system credentials of the user (e.g., LanMan (LM) hash, New Technology (NT) hash, domain passwords, local security authority (LSA) secrets, credential manager secrets, etc.), sensitive user credentials such as internet information services (IIS) application pool, user credentials stored in plain-text on the endpoint device 125, number of browser extensions/plugins associated with the user's browser, user's privileges on the endpoint device 125/server 105, whitelisted applications associated with the user within security infrastructure 140, and automatic logon configurations associated with the user. This type of risk profile may be referred to as user risk profile in some instances.

In some embodiments, the security profile generation unit 234 may generate a risk profile of a system (e.g., endpoint device 125, server 105, etc.) based on one or more of the hardware specifications of the system (e.g., computing device), whether the system is a virtual machine (e.g., if yes, is the virtual machine jail-enabled?), whether the system's operating system updated (e.g., with the latest updates), whether the system has been rebooted within a predefined time frame (e.g., 1 week, 2 weeks, 1 day, 1 month, etc.), list of user accounts on the system, list of shared directories on the system, whether the system has the latest patches, services enabled on the system, connectivity types (e.g., USB, WIFI, Bluetooth, etc.) enabled on the system, and type of security solutions/products/security systems installed or otherwise associated with the system. In some cases, the security profile generation unit 234 may determine the type of security solution/security system by associating specific file types and/or file names on the system with specific security vendors. Table 1 shows an example mapping used by the security profile generation unit 234 to map specific file types on a system to specific vendors to determine a specific security product or solution on the system. In some embodiments, the security profile generation unit 234 can determine whether the system has other security solution such as Enhanced Mitigation Experience Toolkit (EMET), BitLocker, data execution prevention (DEP), Address space layout randomization (ASLR), Exploit Guard, Antimalware Scan Interface (AMSI), Security-Enhanced Linux (SE-Linux), AppArmor, grSecurity, etc., as part of generating a risk profile of the system. In some implementations, the security profile generation unit 234 determines whether the system has End-of-Service or End-Of-Life (EOL) software and/or frameworks as part of generating the risk profile of the system. The security profile generation unit 234 can also use other data associated with the system to generate the risk profile of the system. This data could include: frequency of user logons or logoffs on the system; duration of logons and logoffs on the system; user privileges on the system; operating system type of the system; whether the system is a server or a workstation (e.g., servers won't have options such as Device Guard enabled); list of applications installed on the system (e.g., If applications like Visual Studio, IDE, Python, PowerShell, Git, SVN, Windows, Subsystem for Linux, etc. are installed, then it can be a developer machine. Such machines will have lower security restrictions as they may have whitelisted applications. The system can also be a developer machine based on certain file types (source code files) or databases, etc., on it. The system may also be a system from HR/admin if the percentage of .xls or .doc or .pdf files is higher than other file types. In some cases, the system may be a media developer machine based on files stored on it such as images/movies/etc.). In other cases, the system may be classified based on the presence of unattend.xml, sysprep.xml, sysprep.inf, unattended.xml, web-.config, application Host.config, groups.xml, scheduledtasks.xml, services.xml, and datasources.xml files on it. In some instances, the system may be classified based on the presence of other non-system related files such as McAfee SiteList.xml on it. In further embodiments, the system may be classified based on active directory groups on the system that a user is a member of (e.g., domain admin, etc.).

TABLE 1

| FILE NAME | VENDOR |
|---|---|
| FeKern.sys OR WFP_MRT.sys | FireEye |
| atrsdfw.sys | Altiris (Symantec) |
| edevmon.sys OR ehdrv.sys OR eamonm.sys | ESET |
| klifks.sys OR klifaa.sys OR Klifsm.sys OR klsnsr.sys OR klrsps.sys OR klam.sys | Kaspersky |
| pgpwdefs.sys OR GEProtection.sys OR diflt.sys OR sysMon.sys OR ssrfsf.sys OR emxdrv2.sys OR reghook.sys OR spbbcdrv.sys OR bhdrvx86.sys OR bhdrvx64.sys OR | Symantec |

TABLE 1-continued

| FILE NAME | VENDOR |
|---|---|
| SISIPSFileFilter.sys OR symevent.sys OR vxfsrep.sys OR VirtFile.sys OR SymAFR.sys OR symefasi.sys OR symefa.sys OR symefa64.sys OR SymHsm.sys OR evmf.sys OR GEFCMP.sys OR VFSEnc.sys OR pgpfs.sys OR fencry.sys OR symrg.sys | |
| PSINPROC.SYS OR PSINFILE.SYS OR amfsm.sys OR amm8660.sys OR amm6460.sys | Panda Security |
| CyOptics.sys OR CyProtectDrv32.sys OR CyProtectDrv64.sys | Cylance Inc. |
| CarbonBlackK.sys OR carbonblackk.sys OR Parity.sys OR cbk7.sys OR cbstream.sys | Carbon Black |
| im.sys OR csagent.sys | CrowdStrike |
| esensor.sys | Endgame |
| edrsensor.sys OR hbflt.sys OR bdsvm.sys OR gzflt.sys OR bddevflt.sys OR AVCKF.SYS OR Atc.sys OR AVC3.SYS OR TRUFOS.SYS OR BDSandBox.sys | BitDefender |
| TMUMS.sys OR hfileflt.sys OR TMUMH.sys OR AcDriver.sys OR SakFile.sys OR SakMFile.sys OR fileflt.sys OR TmEsFlt.sys OR tmevtmgr.sys OR TmFileEncDmk.sys | Trend Micro Inc. |
| rvsavd.sys | Retumil Software |
| mbamwatchdog.sys | Malwarebytes |
| SentinelMonitor.sys | SentinelOne |
| mfeaskm.sys OR mfencfilter.sys OR epdrv.sys OR mfencoas.sys OR mfehidk.sys OR swin.sys OR hdlpflt.sys OR mfprom.sys OR MfeEEFF.sys | McAfee |
| csacentr.sys OR csaenh.sys | Cisco |

In some instances, the security profile generation unit 234 may generate a risk profile of a system based on whether the system is part of an active directory. In such instances, the security profile generation unit 234 can determine: whether there are any hidden administrator accounts on the system; whether the user/the system have local and/or remote access; whether the system has a domain administrator token; what the active directory security group memberships on the system are; what the properties of the group, user, and domain are (e.g., Security Identifier (SID) enabled, sensitive, and cannot be delegated, etc.); whether the system permits interactive user logons per computer; whether the system allows use by a local administrator, remote desktop user, distributed component object model (DCOM) user; whether the system allows abusable access control entries from security principals (e.g., administrator); whether the system's domains can be trusted; and the organization unit (OU) structure and group policy object (GPO) links associated with the system.

In some embodiments, the security profile generation unit 234 may generate a risk profile of a system/user based on whether services such as the simple network management protocol (SNMP) of the system are enabled with stored credentials/authorization. The security profile generation unit 234 may also generate a risk profile of the system based on whether unencrypted services such as FTP/telnet enabled on the system. In further embodiments, the security profile generation unit 234 may generate a risk profile of a system/user based on the maximum receive unit for applications (e.g., putty, telnet, network volumes, etc.). In some cases, the security profile generation unit 234 may generate a risk profile of a system/user based on whether certain OS configurations (e.g., AlwaysInstallElevated feature of Windows) are enabled.

Turning back to FIGS. 2 and 3, the cache storage unit 240 may facilitate short-term deployment, storage, access, analysis, and/or utilization of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing malware scanning operations and/or other processes as described herein. For example, elements of the I/O unit 206 may be used to receive input from a user of the endpoint device 125. As described herein, I/O unit 206 may include subunits such as an I/O device 242, I/O calibration unit 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, radio frequency identification (RFID) scanner, and/or another element for presenting and/or otherwise outputting data to a user. In some embodiments, the I/O device 242 may communicate with one or more elements of processing unit 202 and/or memory unit 204 to execute operations associated with malware scanning, detection, displaying visual representations of attack steps used in attack campaigns associated with the malware scanning and detections, displaying visual representations of remediation strategies against an attack campaign, and other operations described herein.

The I/O calibration unit 244 may facilitate the calibration of the I/O device 242. For example, I/O calibration unit 244 may detect and/or determine one or more settings of I/O device 242, and then adjust and/or modify settings so that the I/O device 242 may operate more efficiently.

In some embodiments, I/O calibration unit 244 may utilize a driver 246 (or multiple drivers) to calibrate I/O device 242. For example, driver 246 may include software that is to be installed by I/O calibration unit 244 so that an element of computing environment 200 (or an element of another computing environment) may recognize and/or integrate with I/O device 242 for the malware scanning operations and/or framework processes described herein.

The communication unit 208 may facilitate establishment, maintenance, monitoring, and/or termination of communications between computing environment 200 and other computing environments, third party server systems, and/or the like (e.g., between the server 105 and the endpoint device 125). Communication unit 208 may also facilitate internal communications between various elements (e.g., units and/or subunits) of computing environment 200. In some embodiments, communication unit 208 may include a network protocol unit 248, an API gateway 250, an encryption engine 252, and/or a communication device 254. Communication unit 208 may include hardware and/or software elements.

The network protocol unit 248 may facilitate establishment, maintenance, and/or termination of a communication connection for computing environment 200 by way of a network. For example, network protocol unit 248 may detect and/or define a communication protocol required by a particular network and/or network type. Communication protocols utilized by network protocol unit 248 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for computing environment 200 may include transforming and/or translating data from being compatible with a first communication protocol to being compatible with a second communication protocol. In some embodiments, network protocol unit 248 may determine and/or monitor an amount of data traffic to consequently determine which particular network protocol is to be used for establishing a secure communication connection, transmitting data, and/or performing malware scanning operations and/or other processes described herein.

The application programming interface (API) gateway 250 may facilitate other devices and/or computing environments to access API unit 230 of memory unit 204 of computing environment 200. For example, an endpoint device 125 may access API unit 230 of computing environment 200 via API gateway 250. In some embodiments, API gateway 250 may be required to validate user credentials associated with a user of an endpoint device prior to providing access to API unit 230 to a user. API gateway 250 may include instructions for computing environment 200 to communicate with another device and/or between elements of the computing environment 200.

The encryption engine 252 may facilitate translation, encryption, encoding, decryption, and/or decoding of information received, transmitted, and/or stored by the computing environment 200. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for computing environment 200. In some embodiments, communication device 254 may include one or more radio transceivers, chips, analog front end (AFE) units, antennas, processing units, memory, other logic, and/or other components to implement communication protocols (wired or wireless) and related functionality for facilitating communication for computing environment 200. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Example Implementation

Figure 4:
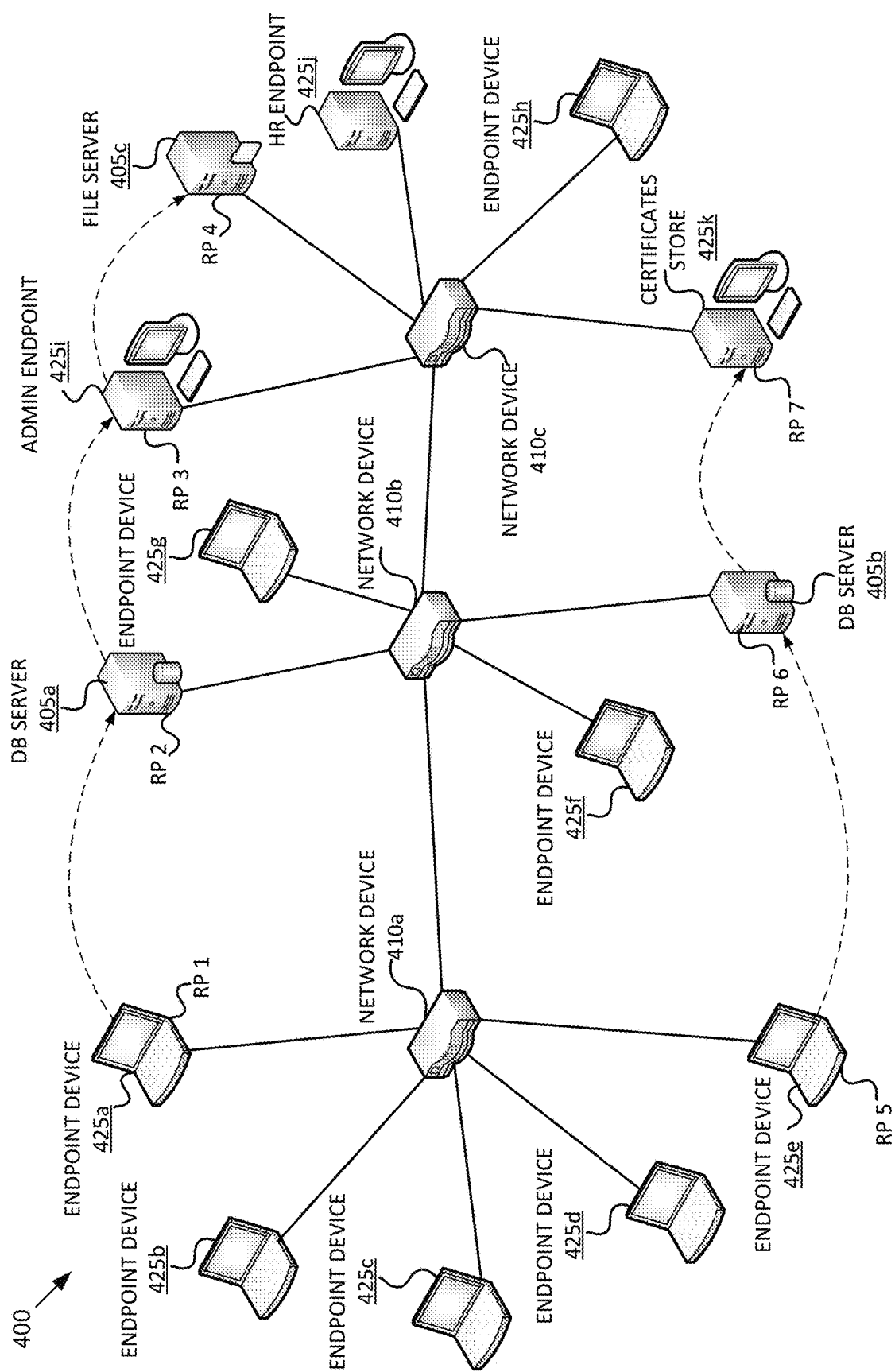
FIG. 4 shows example attack paths for attacks executed against a system, in accordance with some embodiments of this disclosure.

FIG. 4 shows example attack paths generated for a system 400 (e.g., system 100). As can be seen in the figure, the system 400 includes a plurality of endpoint devices 425a, 425b, 425c, 425d, 425e, 425f, 425g and 425h (simply referred to as endpoint devices 425) communicatively coupled to each other via one or more network devices 410a, 410b, and 410c (simply referred to as network devices 410). Also connected to the endpoint devices 425 via the one or more network devices 410 are database (DB) servers 405a and 405b, admin endpoint 425i, file server 405c, HR endpoint 425j, and certificate store 425k.

In one embodiment, the security infrastructure (e.g., security infrastructure 140) associated with the system 400 may determine a risk profile for all of the computing devices, computer assets, etc., of the system 400. Based on the determined risk profile of each computing device or computing asset, the security infrastructure associated with the system 400 may generate one or more attack paths that are used by an attacker to execute an attack campaign against targeted computing devices or assets.

In one implementation, the security infrastructure (e.g., security infrastructure 140) associated with the system 400 may determine a risk profile for some of the computing devices, computer assets, etc., of the system 400 and accordingly generate an attack path based on the generated risk profile. In the illustrated embodiment, the security infrastructure associated with the system 400 determines the risk profiles of some of the computing devices of the system 400. As seen, the risk profile (RP) for DB server 405a is RP 2, for DB server 405b is RP 6, for file server 405c is RP 4, for endpoint device 425a is RP 1, for endpoint device 425e is RP 5, for admin endpoint 425i is RP 3, and for certificates store 425k is RP 7. In one embodiment, the various risk profiles are qualitative information characterizing a given asset or computing device after the security profile generation unit of the security infrastructure determines a risk profile corresponding to the computing device or computer asset in question. For example, qualitative information used to qualify a given computing device or computer asset within the system 400 may include high risk, medium risk, or low risk. A computing device having a high risk designation as a risk profile may be a machine that has severe vulnerabilities that can be easily exploited by an attacker. Likewise, a low risk designated risk profile indicates that the computing device or computer asset in question is secure and less vulnerable to attacks from attackers. A computing device or computer asset within the system 400 having a risk profile qualitatively designated as medium risk is somewhat secure but also vulnerable to some attacks by attackers.

In some embodiments, the security profile generation unit associated with the security infrastructure of the system 400 quantitatively determines the risk profile associated with some or all of the computing devices, and/or computer assets, and/or other devices within the system 400. For example, the security infrastructure associated with the system 400 may determine one or more quantities that can be aggregated or combined into the risk profile for each computing device or computer asset of the system 400. In one embodiment, the security infrastructure associated with the system 400 determines quantities indicative of user behavior associated with specific computer devices, system exploitability (also called system exploitability information) associated with the specific devices, and system criticality associated with the specific devices.

The system exploitability may depend on one or more of conditions discussed above in association with the risk profile of the system. For example, a system exploitability quantity may be computed based on the following:

system exploitability =

(system vulnerability + exposure window + protection window) × 100/3.

The system vulnerability (also called system vulnerability information or simply vulnerability) above may be calculated based on data related to vulnerability and patching (e.g., applying security patches) associated with a given computing device or computer asset. For example, the system vulnerability may be based on one or data related to vulnerability and patching such as hardware specifications of the computing device, whether the operating system of the computing device is up to date, list of shared directories on the computing device, whether the computing device has the latest patches enabled, whether the computing device has the latest services enabled, one or more connectivity types (e.g., USB, WIFI, Bluetooth, etc.) associated with the computing device, and types of security solutions associated with the computing device, etc. In some cases, system vulnerability may refer to features discussed above in association with the risk profile of a system discussed above in with reference to the risk profile generation unit.

In one implementation, system vulnerability may be obtained from the Common Vulnerability Scoring System (CVSS) number that is assigned to one or more applications. In some cases, system vulnerability may be an aggregate of applications used by the computing device for which system exploitability is computed. The CVSS number in one embodiment could range anywhere between 0 and 10 with 10 indicating a high vulnerability and 0 indicating a low vulnerability. For example, the system vulnerability may be obtained using:

system vulnerability = 0.5 × (OS is EOL) + 0.2 × (is OS vulnerable) + 0.2 ×

(are some 1st level apps vulnerable e.g. browser, pdf reader, java) +

0.1 × (are some 2nd level apps vulnerable e.g. WinSCP, WinZip, etc.)

The response to questions such as "is OS vulnerable," "are some 1st level apps vulnerable," etc., are numerical quantities that are determined based on specific implementation considerations.

The exposure window in some instances represents an amount of time (e.g., average amount of time) where the computing device in question remains unpatched after a new patch associated with the computing device (e.g., associated with the security infrastructure of the system 100) is released. Depending on the implementation, this amount of time could be days, hours, minutes, etc., that the computing device in question remains unpatched after a new patch associated with the computing device is released. The protection window represents an amount of time (e.g., average amount of time) where security solutions/security products of the security infrastructure associated with the computing device don't have the latest definitions/latest patches/latest signatures or some other updated content. The protection window could be days, hours, minutes, etc., depending on the implementation.

As previously mentioned, the security infrastructure associated with the system 400 can quantitatively determine a system criticality associated with a specific computing device within the system 400. In one embodiment, the system criticality indicates one or more assets (e.g., files, software resource, hardware resource, etc.) and services (e.g., a service associated with file transfer protocol (FTP), a service associated with hypertext transfer HTTP, a service associated with a domain name system (DNS), etc.) associated with a given system or computing device. For example, the security infrastructure associated with the system 400 may determine a system criticality (also called system criticality information) associated with a given computing device using:

system criticality =

(probability of important *docs* + probability of important services) × 100/2

The probability of important documents may be computed based on the types of documents present on the computing device for which system criticality is being computed. For example, the probability of important docs may be obtained using:

$$(0.5 \times$$

(profile or assess or scan file system, databases, etc. for "juicy files")

/Total number of documents on the computing device)

"Juicy files" may include assets/files with information that are valuable or important and that attackers are likely to exfiltrate. In some embodiments, such files include email information, files with virtual goods, files having user account information, files having user credentials, files having user financial data, etc.

The probability of important services may be computed using:

0.4 × is a part of an active directory (AD) +

0.6 * has a service (file transfer protocol(FTP)

or hypertext transfer HTTP or DNS, etc.) running.

Quantifier's for "is part of an AD," and "has a service running" are numerical quantities that are determined based on specific implementation considerations.

In one implementation, computing devices/computer assets within the system 400 that have a high risk of being attacked are comprised within the top 10% of computing devices/computer assets having the highest system criticality, or having the highest system vulnerability, or having the highest (system criticality+system vulnerability). Tests indicate that in some embodiments, the top exfiltration targets (e.g., computing device/computer asset) within the system 400 are targets comprised in the top 10% of computing devices/computer assets having the highest criticality score. In other implementations, the risk profile may be given by:

$$\text{risk profile} = \text{user behavior} + \text{system exploitability} + \text{system criticality}$$

The user behavior (also referred to as user information) may be quantified based on the risk profile of a user of endpoint device discussed above in association with the security profile generation unit 234 of FIG. 2 or 3. More specifically, the user behavior, the system exploitability, and the system critically may be based on the conditions previously mentioned for determining vulnerable computer assets, based on one or more operations of the security profile generation unit 234 and/or attack path generation unit 236.

In one embodiment, the security infrastructure (e.g., security infrastructure 140) associated with the system 400 may generate or predict an attack path based on the risk profile of one or more computing devices within the system 400. For example, the path generation unit of the security infrastructure may arrange risk targets and exfiltration targets in descending order based on the system criticality and or system vulnerability associated with the risk targets and exfiltration targets. Risk targets and exfiltration targets in this context are targets or computing devices that have been identified as high risk targets and/or having the highest system vulnerability as discussed above. For each risk target and exfiltration target pair, the path generation unit of the security infrastructure may identify all possible network paths connecting the risk target and the exfiltration target. For each identified network path, the path generation unit may calculate a path quantifier given by (lowest exploitability score among all nodes in given path) /number of nodes.

The path generation unit of the security infrastructure then selects a network device (e.g., network router) with the highest path quantifier as a possible lateral movement route between the selected risk target and exfiltration target. In some embodiments, the top 10 network routes are chosen to simulate attacks on the system 400. Applying the foregoing to the devices in FIG. 4, it can be determined that the most probable attack path to file server 405c is to first go through endpoint device 425a and to proceed through DB server 405a and admin endpoint 425i, respectively. This attack path is determined based on determining that file server 405c (exfiltration target) is the most lucrative for data exfiltration based on the value of its risk profile RP 4 and that endpoint device 425a (risk target) is a high risk device based on its risk profile RP 1. In the illustrated example of FIG. 4, the system criticality value included in the risk score RP 1 may be 90, for example. The system exploitability value included in RP 2 may be 70, for example while the system criticality associated with RP 4 may be 80, for example. Applying the steps for attack path prediction outlined above results in the attack path indicated by the dotted arrow between endpoint device 425a and file server 405c. A similar rationale may be applied to determining the attack path between endpoint device 425e and certificates store 425k.

In some embodiments, Graph Theory may be used to create a graphical representation of the most vulnerable/ targetable computing devices/computer assets within the system 400. Based on this, the attack path can be further fine-tuned based on the generated risk profiles of computing devices/computer assets within the system 400.

In other embodiments, risk profiles generated based on the forgoing can be overridden with a manual reputation that a user (e.g., security expert, administrator) enters into the security infrastructure associated with the system 400.

Figure 5:
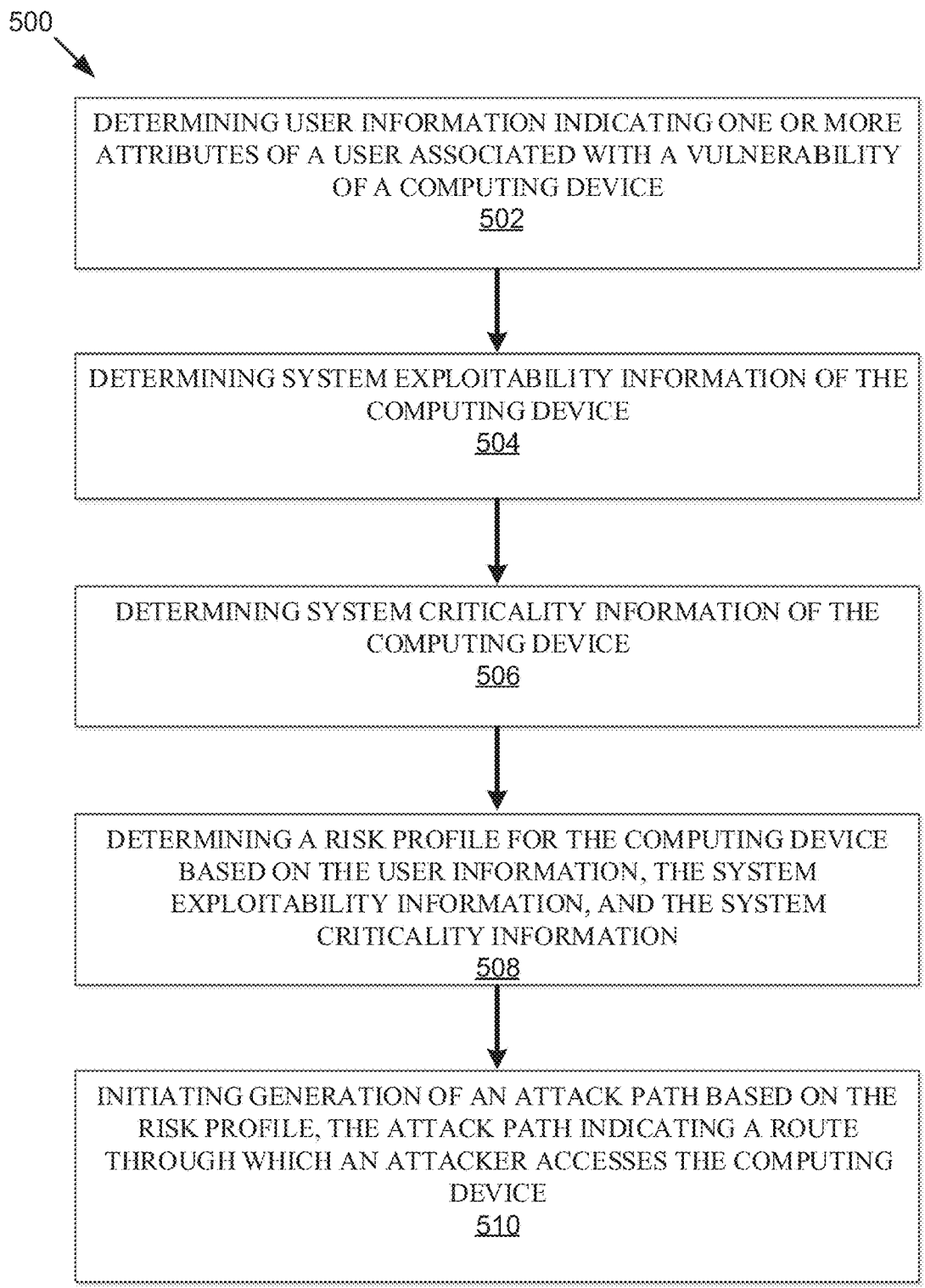
FIG. 5 shows an example flowchart for generating an attack path, in accordance with some embodiments of this disclosure.

FIG. 5 shows an example flowchart for generating an attack path, in accordance with some embodiments of this disclosure. At block 502, the security profile generation unit 234 may determine user information indicating one or more user attributes associated with a vulnerability of a computing device. In one implementation, the one or more user attributes associated with the vulnerability of the computing device comprises: types of websites the user visits, the user's browser history data, types of files the user downloads, types of files the user runs, passwords the user stores in a browser, application and system credentials of the user, sensitive user credentials such as internet information services (IIS) application pool, user credentials stored in plain-text on the computing device, number of browser extensions plugins associated with a browser of the user, number of plugins associated with the browser of the user, privileges of the user on the computing device, whitelisted applications within a security infrastructure associated with the user, and automatic logon configurations associated with the user.

At block 504, the security profile generation unit 234 may determine system exploitability information of the computing device. System exploitability information, in some embodiments, indicates one or more of: the vulnerability associated with the computing device, an exposure window associated with the computing device, and a protection window associated with the computing device. In some cases, the vulnerability is based on factors/data/information relating to vulnerability and patching (e.g., applying security patches or other system patches) associated with the computing device. The factors/data/information relating to vulnerability and patching include on one or more of: a hardware specification of the computing device, whether the operating system of the computing device is up to date, a list of shared directories on the computing device, whether the computing device has the latest patches, whether the computing device has the latest services enabled, one or more connectivity types associated with the computing device, and types of security solutions associated with the computing device. Additionally, the exposure window may represent an average amount of time where the computing device remains unpatched after a new patch associated with the computing device is released while the protection window represents the average time where security solutions of the security infrastructure associated with the computing device do not have one or more of latest definitions, latest patches, and latest signatures.

At block 506, the security profile generation unit 234 may determine system criticality information of the computing device. In some instances, the system criticality information indicates one or more: assets associated with the computing device, and services associated with the computing device.

At block 508, the security profile generation unit 234 may determine a risk profile for the computing device based on the user information, the system exploitability information, and the system criticality information. In some instances, the risk profile is determined based on combining the user information, the system exploitability information, and the system criticality information. In some cases, the risk profile represents a security profile of the computing device or a security profile of a plurality of computing devices and/or systems. This security profile can be used in some embodiments to determine a security posture, accessibility, vulnerability, exploitability, etc. of the computing device or computing devices/systems in question. At block 510, the attack path generation unit may initiate generation of an attack path based on the risk profile. The attack path, in some embodiments, indicates a route through which an attacker accesses the computing device.

Reference in the specification to "one implementation" or "an implementation" means that a particular feature, structure, or characteristic described in connection with the implementation is included in at least one implementation of the disclosure. The appearances of the phrase "in one implementation" or "in some implementations" in various places in the specification are not necessarily all referring to the same implementation.

Some portions of the detailed descriptions above are presented in terms of algorithms, modules, and symbolic representations of operations on data bits within a computer memory. These algorithmic descriptions and representations are the means used by those skilled in data processing arts to most effectively convey the substance of their work to others skilled in the art.

The present disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, any type of disk including floppy disks, optical disks, CD-ROMs, and magnetic disks, read-only memories (ROMs), random access memories (RAMs), EPROMs, EEPROMs, magnetic or optical cards, flash memories including USB keys with nonvolatile memory or any type of media suitable for storing electronic instructions, each coupled to a computer system bus.

The disclosure can take the form of an entirely hardware implementation, an entirely software implementation or an implementation containing both hardware and software elements. In some implementations, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Finally, the foregoing description of the implementations of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, the relevant art, the modules, routines, features, attributes, methodologies and other aspects of the present disclosure can be implemented as software, hardware, firmware, or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way known now or in the future in the art of computer programming. Additionally, the present disclosure is in no way limited to implementation in any specific programming language, or for any specific operating system or environment. Accordingly, the disclosure of the present disclosure is intended to be illustrative, but not limiting, of the scope of the present disclosure, which is set forth in the following claims.

What is claimed is:

1. A method comprising:
   determining user information associated with or based on one or more user attributes associated with a vulnerability of a computing device, wherein the one or more user attributes associated with the vulnerability of the computing device comprises first data associated with at least two of:
   a website or application,
   a browser or application history,
   a downloaded or executed file, or
   a password, privilege, or configuration;
   quantifying the user information associated with or based on the one or more user attributes associated with the vulnerability of the computing device, thereby generating quantified user information;

determining system exploitability information of the computing device, the system exploitability information associated with or based on one or more of:
the vulnerability of the computing device, and
a security window associated with the computing device;
quantifying the system exploitability information of the computing device, thereby generating quantified system exploitability information;
determining system criticality information of the computing device, the system criticality information associated with or based on one or more of:
an asset associated with the computing device, and
a first service associated with the computing device;
quantifying the system criticality information of the computing device, thereby generating quantified system criticality information; and
generating a risk profile for the computing device based on the quantified user information, the quantified system exploitability information, and the quantified system criticality information.

2. The method of claim 1, wherein the one or more user attributes associated with the vulnerability of the computing device comprises at least one of:
a type of a website a user visits;
browser history data associated with the user;
a first file type the user downloads;
a second file type the user runs;
a password the user stores in a browser of the user;
an application or system credential of the user;
a sensitive user credential including an internet information services (IIS) application pool;
a user credential stored in plain-text on the computing device;
a number of browser extension plugins associated with the browser of the user;
a plugin associated with the browser of the user;
a privilege of the user on the computing device;
a whitelisted application within a security infrastructure associated with the user; or
an automatic logon configuration associated with the user.

3. The method of claim 1, wherein the vulnerability of the computing device is based on second data relating to vulnerability or patching associated with the computing device.

4. The method of claim 3, wherein the second data relating to vulnerability or patching includes one or more of:
a hardware specification of the computing device;
whether an operating system of the computing device is up to date;
a list of shared directories on the computing device;
whether the computing device has a latest patch;
whether the computing device has a second service enabled;
one or more connectivity types associated with the computing device; and
a type of security solution associated with the computing device.

5. The method of claim 1, wherein the security window comprises an exposure window associated with or based on an amount of time where the computing device remains unpatched after a new patch associated with the computing device is released.

6. The method of claim 1, wherein the security window comprises a protection window associated with or based on an amount of time where a security infrastructure associated with the computing device does not have one or more of a definition, a patch, or a signature.

7. The method of claim 1, wherein the risk profile is determined based on combining the quantified user information, the quantified system exploitability information, and the quantified system criticality information.

8. The method of claim 1, further comprising initiating generation of an attack path based on the risk profile, the attack path associated with or based on a route through which an attacker accesses the computing device.

9. A computer program product comprising a non-transitory computer useable medium including a computer readable code, wherein the computer readable code when executed using one or more computing device processors, causes the one or more computing device processors to:
determine user information associated with or based on one or more user attributes associated with a vulnerability of a computing device, wherein the one or more user attributes associated with the vulnerability of the computing device comprises first data associated with at least two of:
a website or application,
a browser or application history,
a downloaded or executed file, or
a password, privilege, or configuration;
quantify the user information associated with or based on the one or more user attributes associated with the vulnerability of the computing device, thereby generating quantified user information;
determine system exploitability information of the computing device, the system exploitability information associated with or based on one or more of:
the vulnerability of the computing device, and
a security window associated with the computing device;
quantify the system exploitability information of the computing device, thereby generating quantified system exploitability information;
determine system criticality information of the computing device, the system criticality information associated with or based on one or more of:
an asset associated with the computing device, and
a service associated with the computing device;
quantify the system criticality information of the computing device, thereby generating quantified system criticality information; and
generate a risk profile for the computing device based on the quantified user information, the quantified system exploitability information, and the quantified system criticality information.

10. The computer program product of claim 9, wherein the computer readable code further causes the one or more computing device processors to initiate generation of an attack path based on the risk profile, the attack path associated with or based on a route through which an attacker accesses the computing device, wherein the route comprises one of a digital route, a digital pathway, and one or more computer systems through which an attacker attacks or accesses the computing device.

11. The computer program product of claim 9, wherein the vulnerability of the computing device is based on second data relating to vulnerability or patching associated with the computing device.

12. The computer program product of claim 11, wherein the second data relating to vulnerability or patching includes one or more of:
a hardware specification of the computing device;
whether an operating system of the computing device is up to date;

a list of shared directories on the computing device;
whether the computing device has a latest patch;
whether the computing device has an enabled service;
one or more connectivity types associated with the computing device; and
a type of security solution associated with the computing device.

13. The computer program product of claim 9, wherein the security window comprises an exposure window associated with or based on an amount of time where the computing device remains unpatched after a new patch associated with the computing device is released.

14. The computer program product of claim 9, wherein the security window comprises a protection window associated with or based on an amount of time where a security solution of a security infrastructure associated with the computing device does not have one or more of a definition, a patch, and a signature.

15. The computer program product of claim 9, wherein the risk profile is determined based on combining the quantified user information, the quantified system exploitability information, and the quantified system criticality information.

16. A system comprising:
one or more computing system processors; and
memory storing instructions that, when executed by the one or more computing system processors, causes the system to:
  determine user information associated with or based on one or more user attributes associated with a vulnerability of a computing device, wherein the one or more user attributes associated with the vulnerability of the computing device comprises first data associated with at least one of:
    a website or application,
    a browser or application history,
    a downloaded or executed file, or
    a password, privilege, or configuration;
  quantify the user information associated with or based on the one or more user attributes associated with the vulnerability of the computing device, thereby generating quantified user information;
  determine system exploitability information of the computing device, the system exploitability information associated with or based on one or more of:
    the vulnerability of the computing device, and
    a security window associated with the computing device;
  determine system criticality information of the computing device, the system criticality information associated with or based on one or more:
    assets associated with the computing device, and
    services associated with the computing device;
  quantify the system exploitability information of the computing device, thereby generating quantified system exploitability information;
  quantify the system criticality information of the computing device, thereby generating quantified system criticality information; and
  generate a risk profile for the computing device based on the quantified user information, the quantified system exploitability information, and the quantified system criticality information.

17. The system of claim 16, wherein the vulnerability of the computing device is based on second data relating to vulnerability or patching associated with the computing device.

18. The system of claim 17, wherein the second data relating to vulnerability or patching includes one or more of:
a hardware specification of the computing device;
whether an operating system of the computing device is up to date;
a list of shared directories on the computing device;
whether the computing device has a latest patch;
whether the computing device has an enabled service;
one or more connectivity types associated with the computing device; and
a type of security solution associated with the computing device.

19. The system of claim 16, wherein the security window comprises a protection window associated with or based on an average time where a security of a security infrastructure associated with the computing device does not have one or more of a definition, a patch, and a signature.

20. The system of claim 16, wherein the risk profile is determined based on the quantified user information, the quantified system exploitability information, and the quantified system criticality information.

21. The system of claim 16, wherein the system is further caused to: initiate generation of an attack path based on the risk profile, the attack path associated with or based on a route through which an attacker accesses the computing device.

22. The system of claim 16, wherein the system is further caused to: initiate generation of at least one attack operation based on the risk profile, the at least one attack operation associated with or based on a procedure through which an attacker accesses the computing device.

* * * * *